(12) United States Patent
Tyler

(10) Patent No.: US 11,130,284 B2
(45) Date of Patent: Sep. 28, 2021

(54) SYSTEM AND HEAD FOR CONTINUOUSLY MANUFACTURING COMPOSITE STRUCTURE

(71) Applicant: CC3D LLC, Coeur d'Alene, ID (US)

(72) Inventor: Kenneth Lyle Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 291 days.

(21) Appl. No.: 16/279,878

(22) Filed: Feb. 19, 2019

(65) Prior Publication Data

US 2019/0315055 A1    Oct. 17, 2019

Related U.S. Application Data

(60) Provisional application No. 62/656,866, filed on Apr. 12, 2018.

(51) Int. Cl.
| | | |
|---|---|---|
| *B29C 64/188* | (2017.01) | |
| *B29C 64/307* | (2017.01) | |
| *B29C 64/209* | (2017.01) | |
| *B29C 64/321* | (2017.01) | |
| *B29C 64/118* | (2017.01) | |
| *B33Y 30/00* | (2015.01) | |

(Continued)

(52) U.S. Cl.
CPC .......... *B29C 64/188* (2017.08); *B29C 64/118* (2017.08); *B29C 64/209* (2017.08); *B29C 64/307* (2017.08); *B29C 64/321* (2017.08); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS

| | | |
|---|---|---|
| 3,286,305 A | 11/1966 | Seckel |
| 3,809,514 A | 5/1974 | Nunez |
| 3,984,271 A | 10/1976 | Gilbu |

(Continued)

FOREIGN PATENT DOCUMENTS

| | | |
|---|---|---|
| DE | 4102257 A1 | 7/1992 |
| EP | 2589481 B1 | 1/2016 |

(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Timothy Kennedy
*Assistant Examiner* — Olukorede Esan
(74) *Attorney, Agent, or Firm* — Ryan C. Stockett

(57) ABSTRACT

A print head is disclosed for use in an additive manufacturing system. The print head may include a discharge outlet configured to discharge a continuous reinforcement, and an applicator disposed upstream of the discharge outlet and configured to apply a solid film to the continuous reinforcement prior to discharge. The print head may also include a cure enhancer configured to soften the solid film after discharge.

20 Claims, 2 Drawing Sheets

(51) Int. Cl.
  *B33Y 10/00* (2015.01)
  *B33Y 40/00* (2020.01)

(56) References Cited

U.S. PATENT DOCUMENTS

| | | |
|---|---|---|
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1* | 3/2014 | Tyler ............... B29C 64/393 264/401 |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1* | 10/2014 | Mark ............... B29C 64/209 264/163 |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |

(56) References Cited

U.S. PATENT DOCUMENTS

| | | |
|---|---|---|
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kune et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol CHOI and Se-gon ROH, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

\* cited by examiner

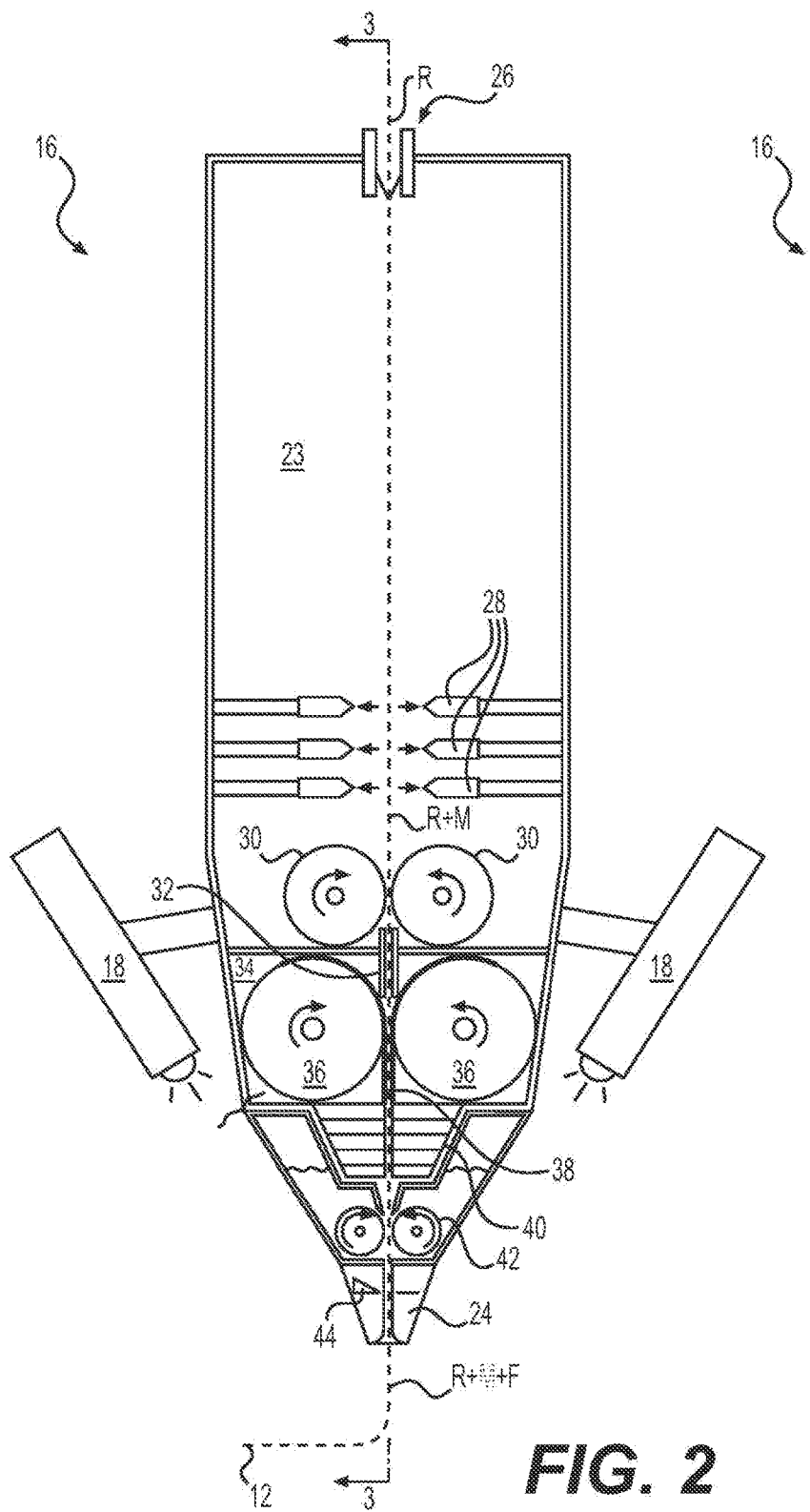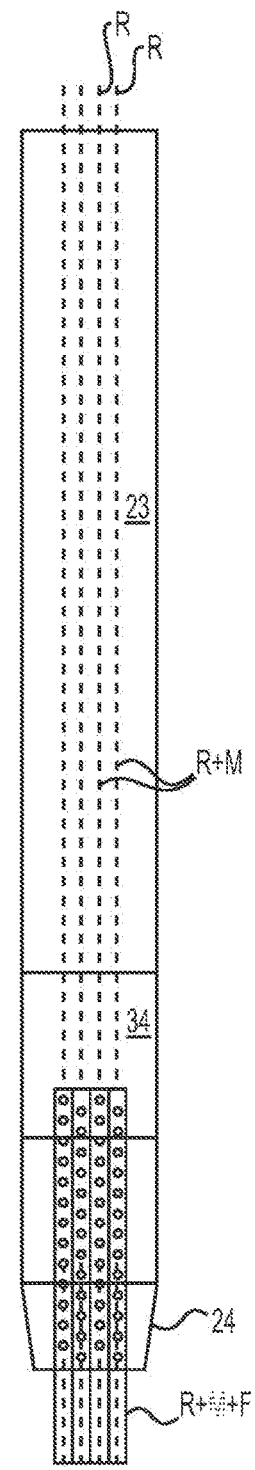
FIG. 2
FIG. 3

SYSTEM AND HEAD FOR CONTINUOUSLY MANUFACTURING COMPOSITE STRUCTURE

RELATED APPLICATIONS

This application is based on and claims the benefit of priority from U.S. Provisional Application No. 62/656,866 that was filed on Apr. 12, 2018, the contents of which are expressly incorporated herein by reference.

TECHNICAL FIELD

The present disclosure relates generally to a manufacturing system and, more particularly, to a system and print head for continuously manufacturing composite structures.

BACKGROUND

Continuous fiber 3D printing (a.k.a., CF3D™) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D™ provides for increased strength, compared to manufacturing processes that do not utilize continuous fiber reinforcement, improvements can be made to the structure and/or operation of existing systems. The disclosed additive manufacturing system is uniquely configured to provide these improvements and/or to address other issues of the prior art.

SUMMARY

In one aspect, the present disclosure is directed to a print head for an additive manufacturing system. The print head may include a discharge outlet configured to discharge a continuous reinforcement, and an applicator disposed upstream of the discharge outlet and configured to apply a solid film to the continuous reinforcement prior to discharge. The print head may also include a cure enhancer configured to soften the solid film after discharge.

In another aspect, the present disclosure is directed to a system for additively manufacturing a composite structure. This system may include a print head having a discharge outlet configured to discharge a continuous reinforcement, and an applicator disposed upstream of the discharge outlet and configured to apply a solid film to the continuous reinforcement prior to discharge. The system may also include a support configured to move the print head during discharging, and a controller configured to selectively activate the support based on known specifications for the composite structure.

BRIEF DESCRIPTION OF THE DRAWINGS

FIGS. 2 and 3 are diagrammatic illustrations of an exemplary disclosed print head that may be used in conjunction with the additive manufacturing system of FIG. 1.

DETAILED DESCRIPTION

Figure 1:
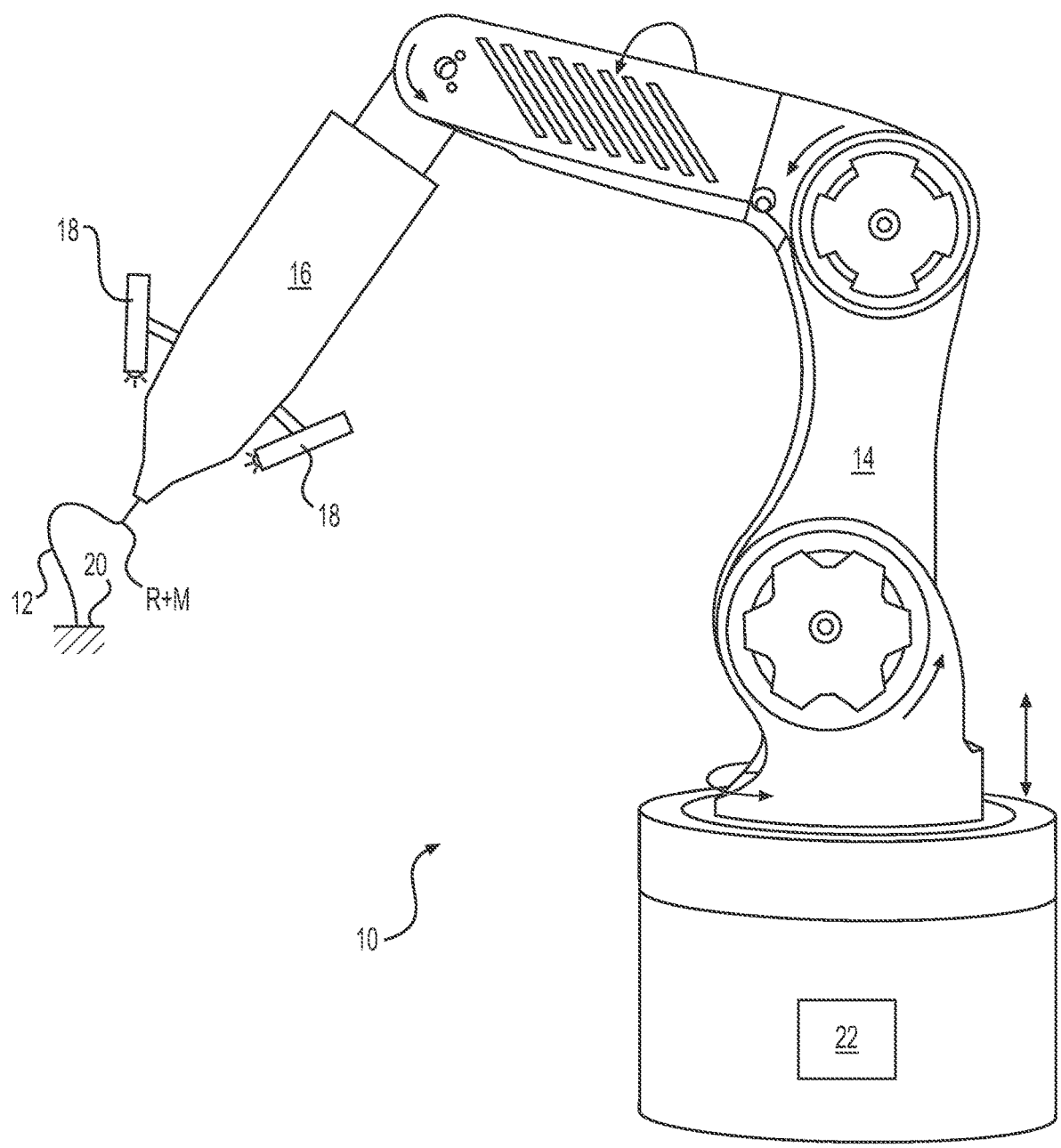
FIG. 1 is diagrammatic illustration of an exemplary disclosed additive manufacturing system.

FIG. 1 illustrates an exemplary system 10, which may be used to continuously manufacture composite structures 12 having any desired cross-sectional shape (e.g., circular, rectangular, or polygonal). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis (e.g., a trajectory) of structure 12 is three-dimensional. Support 14 may alternatively embody an overhead gantry or a hybrid gantry/arm also capable of moving head 16 in multiple directions during fabrication of structure 12. Although support 14 is shown as being capable of 6-axis movements, it is contemplated that any other type of support 14 capable of moving head 16 in the same or a different manner could also be utilized. In some embodiments, a drive may mechanically couple head 16 to support 14, and include components that cooperate to move portions of and/or supply power to head 16.

Head 16 may be configured to receive or otherwise contain a matrix material. The matrix material may include any type of matrix material (e.g., a liquid resin, such as a zero-volatile organic compound resin, a powdered metal, etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., by an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed into and/or through head 16. For example, the matrix material may be fed into head 16, and pushed or pulled out of head 16 along with one or more continuous reinforcements. In some instances, the matrix material inside head 16 may need to be kept cool and/or dark in order to inhibit premature curing or otherwise obtain a desired rate of curing after discharge. In other instances, the matrix material may need to be kept warm for similar reasons. In either situation, head 16 may be specially configured (e.g., insulated, temperature-controlled, shielded, etc.) to provide for these needs.

The matrix material may be used to coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within or otherwise passed through head 16. When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix material discharging from head 16.

The reinforcements may be exposed to (e.g., at least partially coated with) the matrix material while the reinforcements are inside head 16, while the reinforcements are being passed to head 16, and/or while the reinforcements are discharging from head 16. The matrix material, dry reinforcements, and/or reinforcements that are already exposed to the matrix material may be transported into head 16 in any manner apparent to one skilled in the art. In some embodiments, a filler material (e.g., chopped fibers) may be mixed with the matrix material before and/or after the matrix material coats the continuous reinforcements.

One or more cure enhancers (e.g., a UV light, an ultrasonic emitter, a laser, a heater, a catalyst dispenser, a chiller, etc.) 18 may be mounted proximate (e.g., within, on, or adjacent) head 16 and configured to enhance a cure rate and/or quality of the matrix material as it is discharged from head 16. Cure enhancer 18 may be controlled to selectively expose portions of structure 12 to energy (e.g., a positive or negative energy such as UV light, electromagnetic radiation, vibrations, heat, a chemical catalyst, a chilled medium, etc.) during the formation of structure 12. The energy may increase a rate of chemical reaction occurring within the matrix material, sinter the material, harden the material, or otherwise cause the material to cure as it discharges from head 16. The amount of energy produced by cure enhancer 18 may be sufficient to cure the matrix material before structure 12 axially grows more than a predetermined length away from head 16. In one embodiment, structure 12 is completely cured before the axial growth length becomes equal to an external diameter of the matrix coated reinforcement.

The matrix material and/or reinforcement may be discharged from head 16 via at least two different modes of operation. In a first mode of operation, the matrix material and/or reinforcement are extruded (e.g., pushed under pressure and/or mechanical force) from head 16 as head 16 is moved by support 14 to create the 3-dimensional trajectory within a longitudinal axis of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, equally distributing loads, etc.), while also allowing for a greater length of unsupported structure 12 to have a straighter trajectory. That is, the tension in the reinforcement remaining after curing of the matrix material may act against the force of gravity (e.g., directly and/or indirectly by creating moments that oppose gravity) to provide support for structure 12.

The reinforcement may be pulled from head 16 as a result of head 16 moving away from an anchor point 20. In particular, at the start of structure formation, a length of matrix-impregnated reinforcement may be pulled and/or pushed from head 16, deposited onto anchor point 20, and cured such that the discharged material adheres (or is otherwise coupled) to anchor point 20. Thereafter, head 16 may be moved away from anchor point 20, and the relative movement may cause the reinforcement to be pulled from head 16. It should be noted that the movement of reinforcement through head 16 could be assisted (e.g., via internal head mechanisms), if desired. However, the discharge rate of reinforcement from head 16 may primarily be the result of relative movement between head 16 and anchor point 20, such that tension is created within the reinforcement. It is contemplated that anchor point 20 could be moved away from head 16 instead of or in addition to head 16 being moved away from anchor point 20.

A controller 22 may be provided and communicatively coupled with support 14, head 16, and any number of cure enhancers 18. Each controller 22 may embody a single processor or multiple processors that are configured to control an operation of system 10. Controller 22 may include one or more general or special purpose processors or microprocessors. Controller 22 may further include or be associated with a memory for storing data such as, for example, design limits, performance characteristics, operational instructions, tool paths, and corresponding parameters of each component of system 10. Various other known circuits may be associated with controller 22, including power supply circuitry, signal-conditioning circuitry, solenoid driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of lookup tables, graphs, and/or equations. In the disclosed embodiment, the maps may be used by controller 22 to determine the movements of head 16 required to produce the desired size, shape, and/or contour of structure 12, and to regulate operation of cure enhancers 18 in coordination with the movements.

As shown in FIGS. 2 and 3, head 16 may be an assembly of multiple components that cooperate to discharge matrix-coated reinforcements (shown as R+M in FIG. 2). These components may include, among other things, a matrix chamber 23, a discharge outlet (e.g., a nozzle and/or a guide) 24 located at a first end of matrix chamber 23, and an inlet valve 26 located at a second end of matrix chamber 23 opposite discharge outlet 24. It should be noted that the spatial arrangement of these components may be varied, if desired.

Continuous reinforcements (R) may enter matrix chamber 23 via inlet valve 26 and be selectively coated with a matrix (M) therein. Inlet valve 26 may allow passage of the continuous reinforcements into head 16, while at the same time inhibiting matrix from passing out of matrix chamber 23. It is contemplated that the continuous reinforcements may already be at least partially coated with the same or a different matrix upstream of head 16 (e.g., via a stand-alone bath and/or dedicated jets—not shown), if desired. The dry or pre-coated continuous reinforcements may be coated for the first time or receive additional coatings of matrix and/or filler material (e.g., chopped fibers, powdered metal, powdered thermoplastics, etc.) during passage through matrix chamber 23. In the disclosed embodiment, any number of applicators (e.g., low- and/or high-pressure jets) 28 may be used for this purpose. One or more rollers (e.g., a pair of opposing rollers) 30 may be located at an outlet end of matrix chamber 23 and selectively activated (e.g., by controller 22) to pull the matrix-coated continuous reinforcements past applicator(s) 28.

After exiting matrix chamber 23, the matrix-coated continuous reinforcements may pass through another valve 32 into a vacuum chamber 34, in which air bubbles entrained in the matrix may be removed from the composite material. Although a reduced atmospheric pressure within vacuum chamber 34 may be sufficient alone to remove the air bubbles, an optional compactor 36 may be available within vacuum chamber 34 to help press the air bubbles out of the composite material. In addition, compactor 36 may help to consolidate (e.g., to press together) the continuous reinforcements and/or to achieve a precise dimension (e.g., thickness and/or width) of the composite material. In the embodiment of FIGS. 2 and 3, compactor 36 is embodied as a set of opposing rollers. However, it is contemplated that any other type of compactor (e.g., a single roller, a shoe, compressed air, ultrasonic and/or magnetic generators, etc.) may be used for this purpose. It is contemplated that compactor 36 may be used alone (e.g., with the aid of vacuum chamber 34) to remove air bubbles, if desired.

In some embodiments, in addition to facilitating bubble removal and/or compaction of the composite material, compactor 36 may also be used to apply a film 38 (shown as F in FIGS. 2 and 3) over the composite material. The film may include, for example, a thermoplastic ribbon that is spooled onto each of the opposing rollers of compactor 36. With this configuration, as the rollers of compactor 36 roll over the matrix-coated continuous reinforcements, the film is pulled off of the rollers and deposited onto the composite material. It is contemplated that a film applicator other than rollers may be used to deposit the film onto the composite material, if desired. The film may stick to the composite material due to a viscosity of the matrix. Alternatively or additionally, the film may be pressed into the composite material by inward-directed forces of the compacting rollers. It is contemplated that heat and/or vibration may be induced within the rollers of compactor 36 at this time, to enhance the bubble-removing, compacting, and/or film-depositing operations, if desired. It should be noted that the rollers of compactor 36 could alternatively function only as spools in some embodiments, without providing significant compaction. The film may be translucent (e.g., lighter permeable), for purposes of facilitating subsequent curing of the internal matrix.

It is contemplated that the film (e.g., the thermoplastic ribbon) could be specially formulated for integration with and bonding to the matrix (e.g., a thermoset resin) coating the continuous reinforcements, thereby reducing the formation of a potential separation zone. For example, the film could be porous (see FIG. 3), such that the internal matrix from adjacent films can pass through the films and bond with each other. In another example, the film could be formulated to include reactional functional groups similar to what are included within the matrix, allowing for covalent bonds to chemically form between the groups. It is also contemplated that the internal matrix and/or the later-applied film could include a mixture of materials (e.g., a mixture of thermoset and thermoplastic materials), if desired. In some embodiments, the film may be formed from covalent adaptable networks and/or triadzolines, allowing for the film to soften and/or liquefy (i.e., under the right conditions, such as the application of heat or light). This may facilitate the mixing and/or bonding described above. Furthermore, in some examples, the matrix at least partially coating the continuous reinforcements could be the same type of material making up the film. For example, the matrix could be a polymeric thermoplastic (meth) acrylic matrix (e.g., a thermoplastic resin comprising liquid polyester).

In order to help maintain a low-porosity (i.e., a reduced concentration of air bubbles) within the composite material, it may be necessary to preserve the reduced atmospheric pressure imparted by vacuum chamber 34. This may be achieved, for example, by sealing transverse edges of the film. For this purpose, a ribbon edge fuser 40 may be provided. Ribbon edge fuser 40 may embody, for example, an ultrasonic welder, a heated die or roller, etc. that applies vibrations, heat, light, and/or pressure to cause the transverse sides of opposing film layers to bond to each other and thereby create an enclosed bag around the internal composite core.

After the film is fused to the underlying matrix-coated (or dry) continuous reinforcements, the resulting feedstock may be stiffer than the matrix-coated (or dry) continuous reinforcements alone. This increased stiffness may allow for the feedstock to be pushed out of head 16, in some applications, without the risk of the feedstock buckling and/or clogging discharge outlet 24. A feeder 42 (e.g., an additional set of rollers) may be located immediately upstream of discharge outlet 24 (and/or inside of discharge outlet 24) to push the feedstock through discharge outlet 24.

In some applications, a cutter 44 may be located downstream of feeder 42. Cutter 44 may embody, for example, an angled blade that is configured to move through the film-coated composite material and against an associated anvil. It is contemplated, however, that other types of cutters 44 (e.g., ultrasonic cutters, lasers, opposing blades, plasma cutters, etc.) may alternatively be used for this purpose, if desired. One or more actuators (not shown) could be associated cutter 44 and configured to move and/or energize cutter 44 when commanded to do so by controller 22 (referring to FIG. 1).

Upon being extruded from discharge outlet 24, cure enhancers 18 may be used to soften (e.g., melt) the film and/or initiate a hardening reaction of the matrix inside of the film. In the disclosed example, cure enhancers are UV lights, lasers, or IR heaters. It should be recognized, however, that other cure enhancers (e.g., microwave cure enhancers, ultrasonic cure enhancers, etc.) could be used in addition to or in place of the depicted cure enhancers 18 of FIG. 2.

It is contemplated that the film described above could be used selectively, in some applications. For example, it may be necessary to use the film only during startup of a new discharging path (e.g., after operation of cutter 44). This may allow head 16 to push a new lead of material from discharge outlet 24, without the risk of buckling or clogging described above. Thereafter (e.g., after bonding of the new lead of material to anchor point 20 or a previously discharged layer), the rollers of compactor 36 may be moved out of the way, allowing the composite material to thereafter be pulled from discharge outlet 24 without the film coating during movement of head 16 away from the anchoring location.

It is also contemplated that the film could be removed from the composite core after discharge from head 16, if desired. For example, the film may be only temporarily applied, and taken back up by external rollers (not shown) located adjacent the tip end of discharge outlet 24. In this manner, the film may support pushing of the composite material, while not affecting bonding between adjacent layers of the composite material. In this embodiment, the film may be made from any suitable material.

Finally, while the disclosed embodiments are described as utilizing a reinforcement-coating matrix inside of one or more film layers, it is contemplated that the film layers may be applied to the continuous reinforcements without any internal matrix (i.e., dry reinforcements), if desired. That is, the composite material discharging from head 16 could simply include continuous reinforcements cladded with a film, which is softened and/or melted during discharge.

INDUSTRIAL APPLICABILITY

The disclosed systems may be used to continuously manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired surface textures, texture locations, etc. It should be noted that this information may alternatively or additionally be loaded into system 10 at different times and/or continuously during the manufacturing event, if desired. Based on the component information, one or more different reinforcements, matrix materials, and/or film reels may be selectively installed and/or continuously supplied into system 10.

The component information may then be used to control operation of system 10. For example, the reinforcements may be pulled and/or pushed along with the matrix material and/or film from head 16. Support 14 may also selectively move head 16 and/or anchor point 20 in a desired manner, such that an axis of the resulting structure 12 follows a desired three-dimensional trajectory. Once structure 12 has grown to a desired length, structure 12 may be severed from system 10.

It will be apparent to those skilled in the art that various modifications and variations can be made to the disclosed systems. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for additively manufacturing a composite structure, comprising:
   a print head, including:
      a discharge outlet configured to discharge a continuous reinforcement; and
      an applicator disposed inside of the print head and upstream of the discharge outlet and configured to apply a film as a solid at a time of application to the continuous reinforcement prior to discharge;
   a support configured to move the print head during discharging; and
   a controller configured to selectively activate the support based on known specifications for the composite structure.

2. The system of claim 1, further including a cure enhancer configured to soften the film after discharge.

3. The system of claim 2, wherein the cure enhancer is mounted to the print head.

4. The system of claim 2, wherein the print head further includes a matrix chamber configured to apply a matrix coating to the continuous reinforcement prior to application of the film.

5. The system of claim 4, wherein the cure enhancer is further configured to initiate curing of the matrix coating.

6. The system of claim 5, wherein:
   the film is at least one of partially transparent and porous; and
   the cure enhancer is configured to direct cure energy through the film to the matrix coating.

7. The system of claim 4, wherein:
   the film is a thermoplastic; and
   the matrix coating is a thermoset resin.

8. The system of claim 4, wherein the applicator is further configured to at least one of remove air bubbles from the matrix coating and press the film onto the continuous reinforcement.

9. The system of claim 4, wherein the print head further includes rollers configured to pull the continuous reinforcement through the matrix chamber.

10. The system of claim 4, wherein:
    the print head further includes a vacuum chamber located between the matrix chamber and the discharge outlet; and
    the applicator applies the film to the continues reinforcement inside the vacuum chamber.

11. The system of claim 1, further including an edge fuser configured to fuse edges of the film.

12. The system of claim 11, further including a feeder located downstream of the edge fuser and configured to push the continuous reinforcement and the film through the discharge outlet.

13. The system of claim 1, wherein the applicator is configured to apply the film to opposing sides of the continuous reinforcement, such that the continuous reinforcement is sandwiched between layers of the film.

14. The system of claim 1, wherein:
    the continuous reinforcement enters the print head already coated in a first matrix; and
    the print head further includes a matrix chamber configured to apply a second matrix coating to the continuous reinforcement prior to application of the film.

15. A print head for an additive manufacturing system, comprising:
    a discharge outlet configured to discharge a continuous reinforcement;
    an applicator disposed upstream of the discharge outlet and configured to apply a film as a solid at a time of application to the continuous reinforcement prior to discharge; and
    a cure enhancer configured to soften the solid film after discharge.

16. The print head of claim 15, further including a matrix chamber configured to apply a matrix coating to the continuous reinforcement prior to application of the film, wherein the cure enhancer is further configured to initiate curing of the matrix coating.

17. The print head of claim 16, wherein:
    the film is at least one of partially transparent and porous; and
    the cure enhancer is configured to direct cure energy through the film to the matrix coating.

18. The print head of claim 16, wherein the applicator is further configured to at least one of remove air bubbles from the matrix coating and press the film onto the continuous reinforcement.

19. The print head of claim 16, further including a vacuum chamber located between the matrix chamber and the discharge outlet, wherein the applicator applies the film to the continues reinforcement inside the vacuum chamber.

20. The print head of claim 15, further including:
- an edge fuser configured to fuse edges of the film; and
- a feeder located downstream of the edge fuser and configured to push the continuous reinforcement and the film through the discharge outlet.

* * * * *